June 27, 1961  R. E. RICHARDSON  2,990,305
SUPPORTING DEVICE FOR USE WITH NIPPER ROLL PRESS
Filed April 22, 1957  3 Sheets-Sheet 1

RONALD E. RICHARDSON
BY: Cushman, Darby & Cushman
ATTORNEYS

June 27, 1961  R. E. RICHARDSON  2,990,305
SUPPORTING DEVICE FOR USE WITH NIPPER ROLL PRESS
Filed April 22, 1957  3 Sheets-Sheet 3

RONALD E. RICHARDSON
BY: Cushman, Darby & Cushman
ATTORNEYS

United States Patent Office 2,990,305
Patented June 27, 1961

2,990,305
SUPPORTING DEVICE FOR USE WITH
NIPPER ROLL PRESS
Ronald E. Richardson, Oshawa, Ontario, Canada, assignor to Pittsburgh Plate Glass Company, Pittsburgh, Pa.
Filed Apr. 22, 1957, Ser. No. 654,399
5 Claims. (Cl. 154—2.7)

This invention relates to a supporting device designed to support at least a substantial proportion of the weight of an elongated laminated safety glass article (such as an automobile windshield) while the same is being manually maneuvered through the rolls of a nipper roll press.

The trend in the design of automobile windshields is to the use of larger and larger sheets of glass, with the result that the weight of glass that must be lifted by the operator is constantly increasing. When passing a windshield of the wrap-around type through a pair of nipper rolls it is necessary initially to hold the windshield almost vertically in an elevated position with the lower projecting "ear" of the windshield facing towards the press and adjacent the entrance to the rolls. As this end of the glass is fed between the rolls and the sharply curved portion of the windshield intermediate the ear and the main body of the windshield passes through the rolls the remainder of the glass sheet must swing rapidly downwards into a more or less horizontal position. Once the other end of the windshield encounters the rolls, the bulk of the glass, which will now be beyond the rolls, will have to be swung up again to enable the rolls to follow the sharp curvature of the glass at the base of the other ear.

It is being found that the forces necessary properly to support and guide such a windshield through a pair of nipper rolls are becoming excessive for manual operation and the efficiency of operators is falling off because of undue fatigue.

The supporting device of the present invention is designed to absorb a significant proportion of the dead weight of the windshield to relieve the operator while he is feeding the windshield into and guiding it through a nipper roll press.

Pivotally mounted arms secured to the press and underlying the glass have previously been proposed for this purpose, but the comparatively complex path of movement of the glass has rendered such devices ineffectual unless they are extremely complicated in construction. Such prior devices have been arranged to support the windshield at one end, the end chosen being the one which, at the time being, is farthest from the rolls.

The present invention is based on the idea that the windshield should be supported as far as possible substantially at its centre of gravity. Even so, to do this with the arm type of support would still be complicated, because the centre of gravity of the glass is never stationary and the path it traces out is a sharply bent curve.

The present invention consists of the combination of a nipper roll press for the preliminary pressing of elongated laminated glass panels, and an assembly for supporting at least part of the weight of each such panel during passage through the press, said assembly comprising a supporting device having spaced contact pads for substantially non-slip engagement with said panel, cable means arranged laterally of the press and depending from an upper part of the press to engage said supporting device, and means tensioning said cable means.

A manner in which the invention may be carried into practice is illustrated by way of example in the accompanying drawings, in which.

Figure 1:
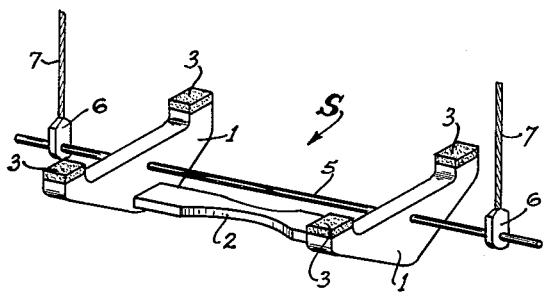
FIGURE 1 shows a perspective view of a supporting device according to the invention.

The supporting device S seen in FIGURE 1 consists of a pair of wooden arms 1 held spaced apart and in parallel relationship by an interconnecting wooden bar 2. On each end of each of the arms 1 is a rubber contact pad 3. The spacing apart of the arms 1 is such that when the device is placed beneath a windshield 4 as shown in FIGURES 2 and 3, the rubber pads 3 bear against the undersurface of the windshield 4 towards the lateral edges thereof.

A metal rod 5 extends through the device S, passing centrally through each of the arms 1, this rod 5 being pivotally mounted at each end in lugs 6 secured each to one end of a cable 7. The centre of gravity of the supporting device lies below the plane in which the rod 5 lies so that the device will remain in equilibrium in the position seen in FIGURE 1.

Figure 2:
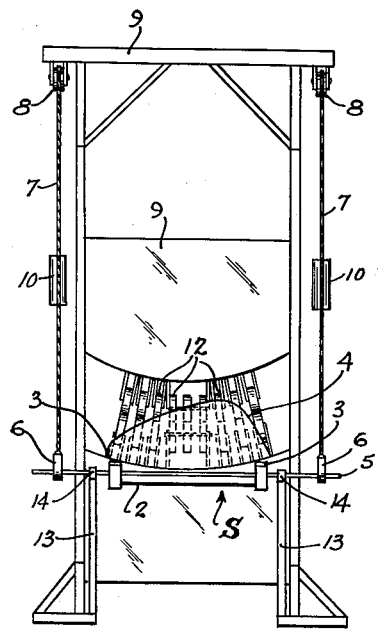
FIGURE 2 shows a simplified front view of a nipper roll press, illustrating the manner of mounting the device of FIGURE 1, and showing a windshield in position for insertion thereinto.
Figure 3:
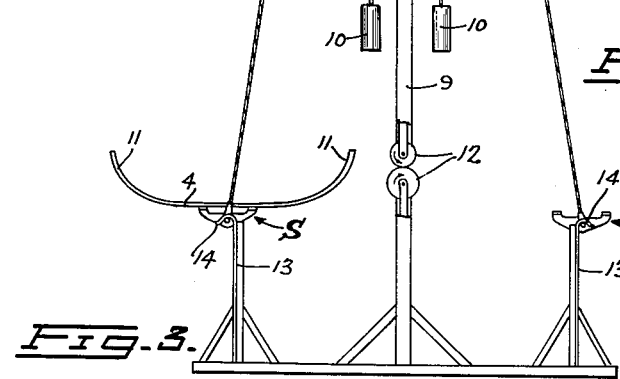
FIGURE 3 is a side view of FIGURE 2.

As appears from FIGURES 2 and 3, each of the cables 7 passes upwardly and over a pair of idling pulleys 8 mounted near the head of the nipper roll press shown generally at 9. After passing over the pulleys 8, each cable 7 extends downwardly again and carries a counterweight 10 on its free end, these weights 10 are such as together to be approximately equal to the weight of the supporting device S and a windshield.

Conveniently, a similar supporting device S' is provided on the exit side of the press. This device S' will be identical in all respects to the supporting device S, and will be engaged under the windshield 4 as soon as a sufficient length of such windshield has emerged from the rolls 12.

The manner in which the devices S and S' are used is illustrated in FIGURES 3 to 7. Initially, in the inoperative position, each device S, S' is held down by a fixed restraining structure in the form of a pair of spaced inverted hooks 14 carried on posts 13 secured to the lower framework of the press 9, each hook engaging over one end of the rod 5. As shown in FIGURE 3, the windshield 4 is then placed centrally one the input supporting device S, with such windshield lying horizontally and with its end ears 11 extending upwardly, i.e. with the windshield concave side uppermost. This is the same position as is illustrated in FIGURE 2.

Figure 4:
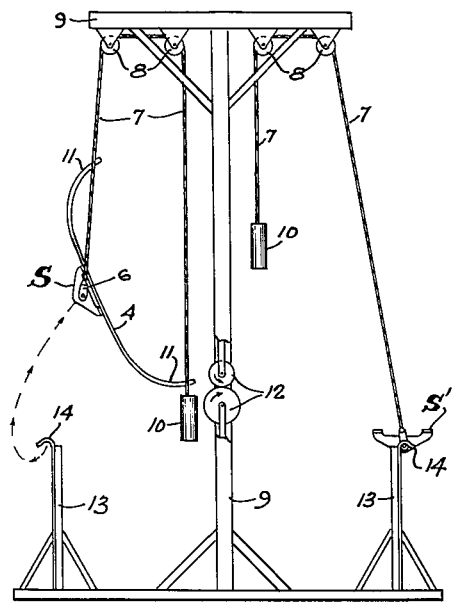
FIGURES 4 to 7 are views similar to FIGURE 3 showing the successive positions occupied by such windshield during the rolling operation.

The windshield is moved downwardly to disengage the hooks 14 and then towards the nipper rolls 12 of the press 9 to bring the tip of the leading ear 11 into the plane tangential to the meeting surfaces of the rolls 12. This movement is shown in FIGURE 4. The rubber pads 3 will largely prevent slippage between the windshield 4 and the supporting device S, although for this purpose it may be necessary for the operator to apply a certain degree of manual pressure with one or both hands forcing the windshield 4 firmly against the device S. At the same time the device S will continue to support the majority of the weight of the windshield 4.

Figure 5:
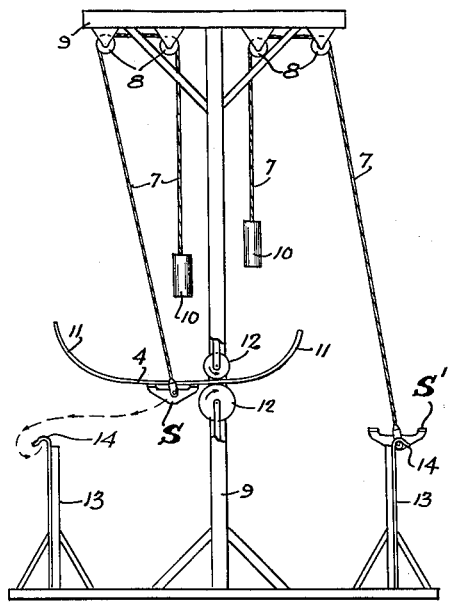
Figure 6:
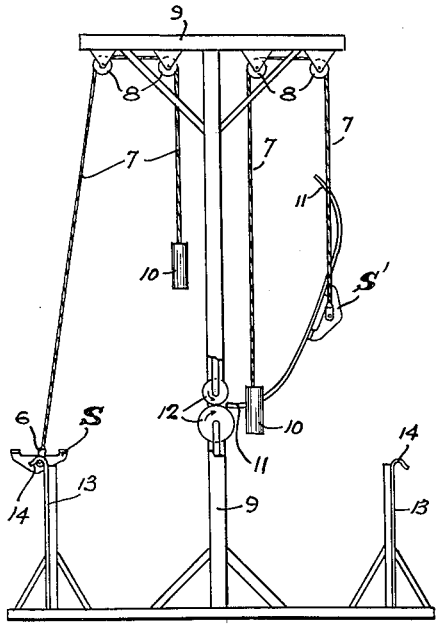

As the windshield 4 passes into the space between the rolls 12 the position shown in FIGURE 5 is quickly reached with the windshield 4 once again substantially horizontal. By this time the bulk of the weight of the windshield is supported by the press and the supporting device S can be moved by the operator down and away (as indicated by the arrows) to be re-engaged with the hooks 14. If necessary the trailing end of the windshield 4 can be lightly supported manually by the operator.

Figure 7:
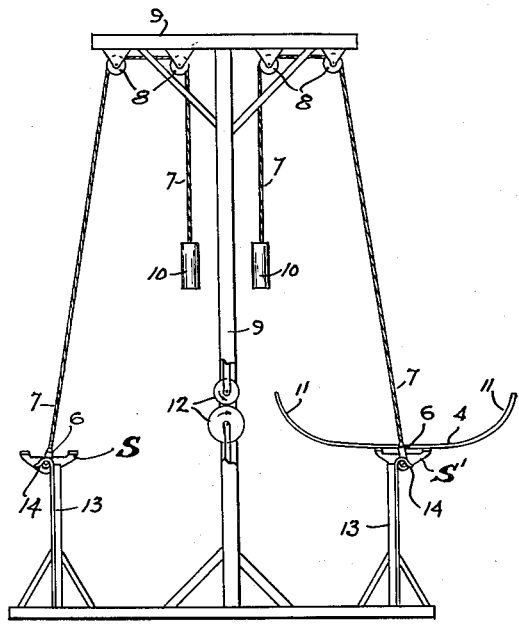

The operator then releases the supporting device S' on the output side of the press and places this device beneath the centre of the windshield 4. As on the input side of the press, the supporting device S' will absorb the majority of the weight of the windshield 4 while the operator simply guides the same into the necessary upturned position shown in FIGURE 6 for the trailing ear 11 to pass between the rolls 12. FIGURE 7 shows the position corresponding to FIGURE 3 with the windshield 4 fully supported by the device S' after passage through the press 9 and the device S' being re-engaged with its hooks 14 before removal of the windshield.

Instead of arranging the pulleys 8 in a fixed position just outwardly of the rolls 12, at the head of the press 9, these pulleys could be arranged on a member horizontally slidably mounted at the head of the press so that in all positions the cables 7 will extend more directly vertically than they do in some positions under the present system.

As will be evident, any substitute means (such as springs) for tensioning the cables can be employed instead of the counterweights.

Figure 9:
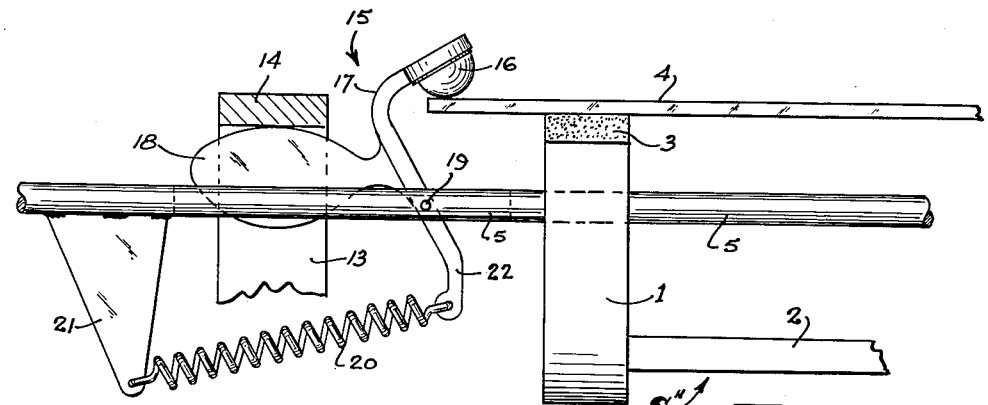
FIGURE 9 is an enlarged fragment of the device of FIGURE 8.
Figure 10:
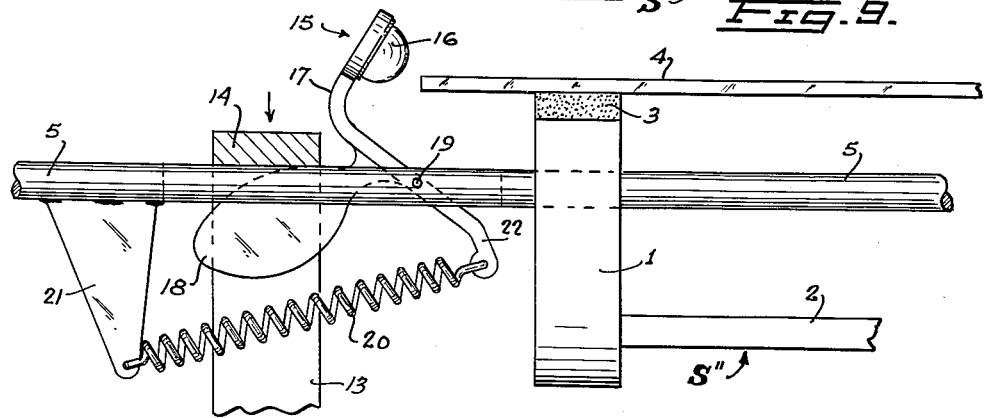
FIGURE 10 is similar to FIGURE 9 showing the device in a different position.
Figure 8:
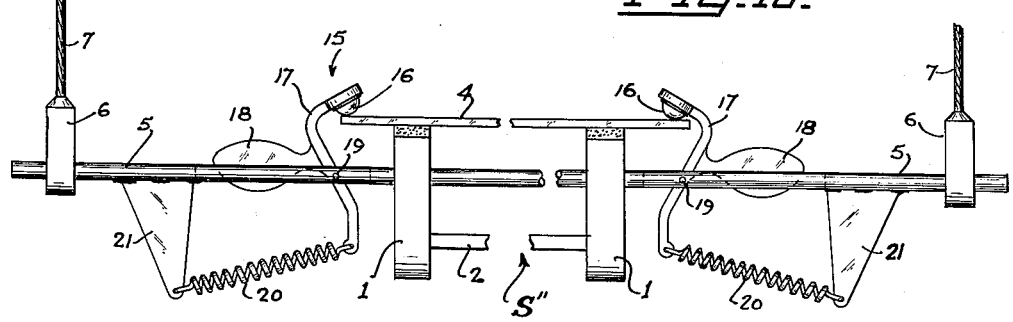
FIGURE 8 is a broken view of a modified form of supporting device.

FIGURES 8 to 10 show a modified form of supporting device S'' which incorporates clamping means, thus eliminating the need for the operator to press the glass manually against the contact pads 3. The device S'' is similar to the device S except that, additionally, each end of the rod 5 is slotted between the arm 1 and the lug 6. Within each such slot a pin 19 pivotally mounts a clamping arm 15 which is bent at 17 to carry a resilient contact pad 16 at its upper free end. The lower end 22 of each clamping arm 15 has connected to it one end of a tension spring 20, the other end of which is connected to a depending bracket 21 fixed to the rod 5. The springs 20 thus urged the clamping arms 15 into their operative positions, that is with their pads 16 pressing down on the upper surface of the glass panel 4 which has been placed on the device S''. The extent of this pressure, which is determined by the strength and adjustment of the springs 20, can be selected to ensure adequate clamping of the glass panel for all positions of the supporting device encountered in practice.

To facilitate ready release of the glass, each clamping arm 15 is preferably provided with a clamp control member in the form of projecting plate 18 which is movable within the slot formed in the rod 5 and which is positioned for co-operation with an underside surface of one of the hooks 14. This co-operation is shown in FIGURES 9 and 10, the latter figure demonstrating how the plate 18 is forced downwardly by the hook 14 as the device S'' is placed in its inoperative position held down by such hooks. Downward movement of the plate 18 acts to release the clamping arms 15 and thus to permit removal of the glass panel 4. The plates 18 are also convenient for manual release of the clamping arms by the operator, as will be necessary when the device is withdrawn from the glass on the input side of the press and when the companion device is brought into engagement with the glass on the output side. If necessary, a known form of quick release mechanism may also be incorporated in this clamping arrangement.

Figure 11:
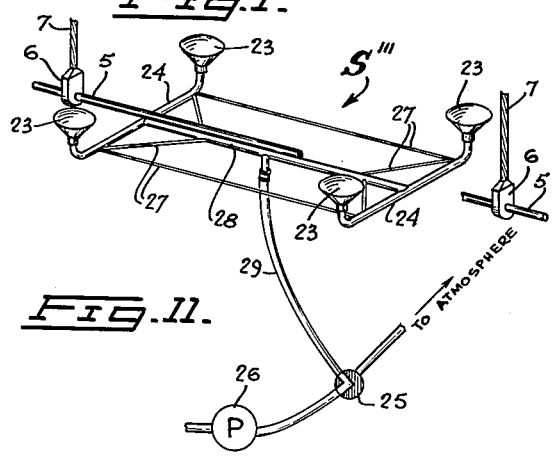
FIGURE 11 is a perspective view of a further modified form of supporting device.

Finally, as shown diagrammatically in FIGURE 11, the need for clamping the glass panel from the top may be eliminated by replacing the simple contact pads 3 with suction cups 23. In this form of supporting device S''', a tubular structure has been adopted, the suction cups 23 being mounted on the ends of tubular arms 24 which are internally connected by a central pipe 28 secured to rod 5 and by flexible tube 29 to a valve 25 and pump 26. Struts 27 complete the assembly.

I claim:

1. An assembly for supporting at least part of the weight of an elongated laminated glass panel during simultaneous tilting and swinging movements of the panel, said assembly comprising a fixed overhead structure, pulleys mounted on the fixed overhead structure each for rotation about a horizontal axis, a pair of cables supported each by a respective said pulley for free swinging movement of a depending end of each cable about the horizontal axis of its pulley, lugs secured at said ends of said cables, a rod mounted at its respective ends on said lugs, a panel-supporting device mounted on said rod between said cables for free pivoting movement relative to said lugs, said device including spaced contact pads extending upwardly above said rod, the centre of gravity of said device being below the rod, said contact pads being constructed and arranged to support said panel by a substantially non-slip engagement spaced above said rod, and means to tension said cables to offset the weight of said cables, lugs, rod, panel-supporting device and at least part of the weight of said panel.

2. The assembly of claim 1, wherein the cable-tensioning means includes counterweights connected to the other ends of the cables.

3. An assembly for supporting at least part of the weight of an elongated laminated glass panel during simultaneous tilting and swinging movements of the panel, said assembly comprising a fixed overhead structure, a pair of cables supported from said overhead structure for free swinging movement of the depending ends thereof each about a horizontal axis, lugs secured at said depending ends of said cables, a rod mounted at its respective ends in said lugs, a panel-supporting device mounted on said rod between said cables for free pivoting movement relative to said lugs, said device including spaced contact pads extending upwardly above said rod, the centre of gravity of said device being below the rod, said contact pads being constructed and arranged to support said panel by a substantially non-slip engagement spaced above said rod, and means to tension said cables to offset the weight of said cables, lugs, rod, panel-supporting device and at least part of the weight of said panel.

4. The assembly of claim 3, including means on said supporting device for clamping said panel to said supporting device, and a fixed structure positioned for engagement with said supporting device to hold the same and the depending ends of said cables attached thereto in an inoperative position restrained from said free swinging movement, said restraining structure being so constructed and arranged that the engagement of said supporting device with said structure effects disengagement of said clamping means to free the panel from said supporting device, and disengagement of said supporting device from said structure effects engagement of said clamping means to clamp the panel to said supporting device.

5. The assembly of claim 3, including a clamp pivotally mounted on said supporting device for clamping said panel thereto, spring means urging said clamp into clamping position and a control member connected to said clamp for movement thereof against the action of said spring means, and a fixed structure positioned for engagement with said supporting device to hold the same and the depending ends of said cables attached thereto in an inoperative position restrained from said free swinging movement, said restraining structure having a surface constructed and arranged to move and hold said clamp control member against the action of said spring means during engagement of said restraining structure by said supporting device whereby to release said panel from said supporting device.

(References on following page)

References Cited in the file of this patent

UNITED STATES PATENTS

| | | |
|---|---|---|
| 1,931,700 | Murphy et al. | Oct. 24, 1933 |
| 2,075,726 | Kamerer | Mar. 30, 1937 |
| 2,172,199 | Haworth et al. | Sept. 5, 1939 |
| 2,391,936 | Wilson | Jan. 1, 1946 |
| 2,628,453 | Pye et al. | Feb. 17, 1953 |
| 2,755,950 | Forshey | July 24, 1956 |

FOREIGN PATENTS

| | | |
|---|---|---|
| 431,573 | France | Nov. 14, 1911 |